(12) United States Patent
Hewitt

(10) Patent No.: US 9,359,073 B2
(45) Date of Patent: Jun. 7, 2016

(54) AIRCRAFT TAIL ROTOR SYSTEM

(71) Applicant: Sikorsky Aircraft Corporation, Stratford, CT (US)

(72) Inventor: John E. Hewitt, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 468 days.

(21) Appl. No.: 13/958,161

(22) Filed: Aug. 2, 2013

(65) Prior Publication Data

US 2015/0034760 A1    Feb. 5, 2015

(51) Int. Cl.
| | |
|---|---|
| *B64C 27/82* | (2006.01) |
| *F16C 41/00* | (2006.01) |
| *F16C 19/52* | (2006.01) |
| *F16C 19/54* | (2006.01) |

(52) U.S. Cl.
CPC ............... *B64C 27/82* (2013.01); *F16C 19/52* (2013.01); *F16C 19/54* (2013.01); *F16C 41/001* (2013.01); *F16C 2326/43* (2013.01)

(58) Field of Classification Search
CPC ......... B64C 27/82; F16C 19/52; F16C 19/54; F16C 41/001
USPC ..................................................... 244/17.12
See application file for complete search history.

(56) References Cited

U.S. PATENT DOCUMENTS

| | | | |
|---|---|---|---|
| 2,822,225 A | 2/1958 | Teufel | |
| 3,572,616 A | 3/1971 | Ulisnik | |
| 3,574,483 A | 4/1971 | Linden | |
| 3,737,202 A | 6/1973 | Rosales | |
| 4,212,441 A * | 7/1980 | Ascani et al. | 244/46 |
| 4,465,951 A * | 8/1984 | Dalby | 310/114 |
| 4,664,539 A | 5/1987 | Li | |
| 4,912,999 A | 4/1990 | Franks et al. | |
| 5,906,476 A | 5/1999 | Arlton | |
| 7,530,790 B2 | 5/2009 | Cabrera et al. | |
| 7,585,153 B1 | 9/2009 | Schmaling et al. | |
| 7,988,089 B2 | 8/2011 | Wittmer | |
| 8,142,158 B2 | 3/2012 | Schmaling et al. | |
| 8,292,509 B2 | 10/2012 | Montagu et al. | |
| 8,439,640 B2 | 5/2013 | Arel et al. | |
| 2003/0122540 A1* | 7/2003 | Fite | F16C 19/52 324/175 |
| 2005/0061920 A1* | 3/2005 | Brault et al. | 244/165 |
| 2008/0253891 A1 | 10/2008 | Cabrera et al. | |
| 2009/0097973 A1 | 4/2009 | Cabrera et al. | |
| 2009/0220341 A1* | 9/2009 | Schmaling et al. | 416/114 |
| 2010/0178002 A1 | 7/2010 | Spieth et al. | |
| 2011/0150646 A1* | 6/2011 | D'Anna | 416/1 |
| 2011/0211953 A1* | 9/2011 | Stille | 416/1 |

* cited by examiner

*Primary Examiner* — Justin Benedik

(74) *Attorney, Agent, or Firm* — Cantor Colburn LLP

(57) ABSTRACT

An aircraft tail rotor system is provided and includes a rotating element, a translating element and a structure including a first bearing in series with a second bearing, the first bearing including a component rotatable with and movable within the rotating element in accordance with translational movement of the translating element. The structure is configured to selectively use the second bearing to prevent transmission of rotational energy from the rotating element to the translating element in an event of a seizing of the first bearing.

17 Claims, 4 Drawing Sheets

AIRCRAFT TAIL ROTOR SYSTEM

BACKGROUND OF THE INVENTION

The subject matter disclosed herein relates to an aircraft tail rotor system and, more particularly, to an aircraft tail rotor system including a pitch change shaft bearing assembly.

In many current helicopters or rotary machines (hereinafter "aircraft"), a helicopter tail rotor (TR) system converts tail driveshaft rotary power into the aerodynamic forces necessary to control the direction of flight and to counteract main rotor torque.

A tail rotor head system provides a mounting point for tail rotor blades (TRBs) and for a blade pitch change mechanism. The pitch of the TRBs is controlled by the position of the tail rotor pitch change shaft (PCS) and positioning of the PCS is controlled by a pitch change servo. When the pitch change servo pulls the PCS inboard, the pitch beam and pitch change links twist the TRBs about internal elastomeric bearings to increase blade pitch. Conversely, when the pitch change servo permits the PCS to move outboard, the pitch beam and pitch change links twist the TRBs about internal elastomeric bearings to decrease blade pitch. An increase in blade pitch will turn the aircraft direction to the left and a decrease in pitch will turn the aircraft direction to the right.

The PCS rotates with and moves linearly within a rotating TR shaft. A PCS bearing supports the PCS within the TR shaft and allows the PCS and TR shaft to rotate independently of the non-rotating pitch change servo rod. The PCS bearing outer raceway rotates with the PCS and the TR shaft, while the inner raceway is non-rotating but moves linearly with the pitch change servo rod.

BRIEF DESCRIPTION OF THE INVENTION

According to one aspect of the invention, an aircraft tail rotor system is provided and includes a rotating element, a translating element and a structure including a first bearing in series with a second bearing, the first bearing including a component rotatable with and movable within the rotating element in accordance with translational movement of the translating element. The structure is configured to selectively use the second bearing to prevent transmission of rotational energy from the rotating element to the translating element in an event of a seizing of the first bearing.

According to another aspect of the invention, a bearing assembly is provided and includes a primary bearing including first and second raceways, the first raceway being rotatable with and movable within a rotating element in accordance with movements of a translating element, a secondary bearing including a third raceway non-rotatably coupled to the second raceway and a fourth raceway non-rotatably coupled to the translating element and a lock coupled to the secondary bearing and disposed to prevent relative rotation between the third and fourth raceways and to selectively permit the relative rotation in accordance with a condition of the primary bearing.

According to yet another aspect of the invention, an aircraft tail rotor system is provided and includes a rotating element, a translating element and a bearing assembly. The bearing assembly includes a primary bearing including first and second raceways, the first raceway being rotatable with and movable within the rotating element in accordance with movements of the translating element, a secondary bearing including a third raceway non-rotatably coupled to the second raceway and a fourth raceway non-rotatably coupled to the translating element and a lock coupled to the secondary bearing and disposed to be selectively locked to prevent relative rotation between the third and fourth raceways and to be unlocked to permit the relative rotation in accordance with a condition of the primary bearing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
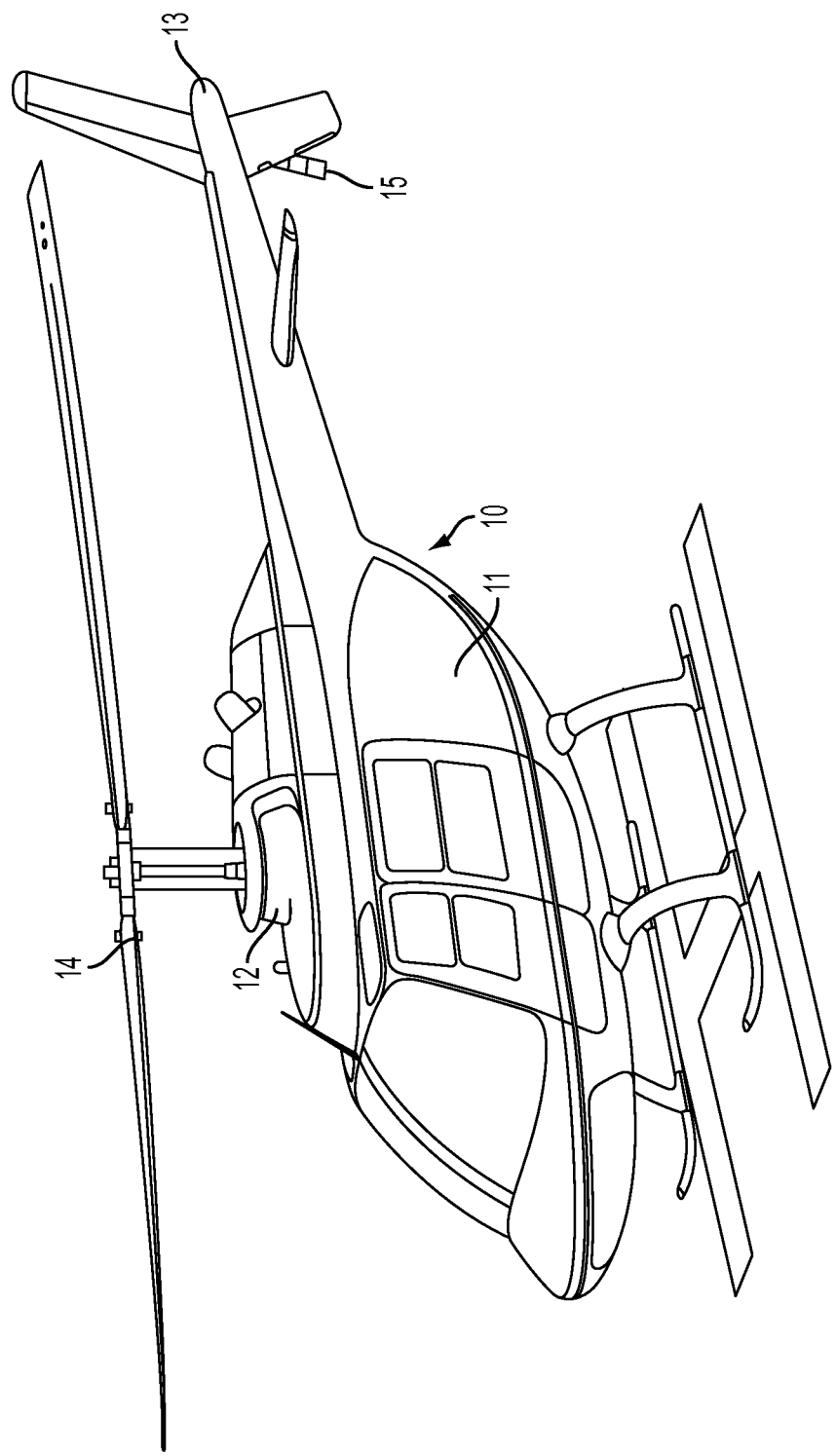
FIG. 1 is a schematic illustration of an aircraft in accordance with embodiments.

The detailed description explains embodiments of the invention, together with advantages and features, by way of example with reference to the drawings.

DETAILED DESCRIPTION OF THE INVENTION

PCS bearing failures have occurred in flight due to uncertain, undetermined or multiple root causes including foreign object damage, inadequate lubrication, improper installation, improper maintenance and improper manufacturing. Absolute prevention of these causes is not likely and PCS bearing failures may continue to occur.

In accordance with aspects of the present invention, a redundant PCS bearing is provided. The redundant PCS bearing includes one primary bearing that operates as the only bearing and as the current PCS bearing design during all normal conditions and a secondary redundant or backup bearing. The inner raceway of the primary bearing could be connected to the outer raceway of the secondary bearing. In the redundant PCS bearing, the secondary bearing inner and outer raceways and rolling elements would be adhered, attached or secured together with sufficient strength that under normal operation no relative rotation would occur and no undesirable radial or axial play or looseness would be introduced.

In the event of a primary PCS bearing failure or seizure, the secondary bearing would become activated and the inner and outer raceways and rolling elements would begin to rotate separately, allowing free rotation of the PCS and the TR shaft, thus preventing severing of the connection to the pitch change servo and the resultant loss of control of the helicopter. The additional torsional loading imposed on the secondary bearing by seizure of the primary bearing would separate a frangible connection between the inner and outer raceways causing activation and functioning as a normal bearing. The purpose of the redundant PCS bearing is to temporarily mitigate the failure, so the separation of the frangible adherence or attachment of the inner to outer raceways would cause an uncharacteristic noise, vibration or debris that would be detectable by the existing aircraft monitoring systems, and thus provide indication that the primary bearing has failed and must be replaced. A separation would be provided to prevent debris from a failed primary bearing from contaminating and causing failure of the secondary bearing. The redundant PCS bearing would enable longer service life and increased inspection intervals because failure of a primary bearing would result only in a need for routine maintenance, instead of a catastrophic event.

The redundant PCS bearing does not necessarily need to be radially superimposed, coaxially arranged or be in immediate proximity of the primary PCS bearing. Since the redundant PCS bearing will provide an indication that the primary bearing has seized, failed or is failing, an operator can take corrective action and replace it before failure of the redundant secondary bearing occurs. The redundant PCS bearing provides temporary bearing function for a period of time to preserve control of the helicopter and prevent catastrophic results.

With reference to FIG. 1, an aircraft 10 is provided. The aircraft 10 may be a helicopter, a compound helicopter or a rotary machine. The aircraft 10 includes an airframe 11, which is formed to define a cabin, a main rotor section 12 and a tail section 13. An engine and a drive train are disposed within the airframe 11 and respectively generate and transmit torque to drive rotation of a main rotor 14, which is supportively disposed at the main rotor section 12, and to drive rotation of a tail rotor 15, which is supportively disposed at the tail section 13. The rotation of the main rotor 14 generates lift for the aircraft 10 and the rotation of the tail rotor 15 generates thrust and counteracts torque exerted on the airframe 11 by the main rotor 14.

Figure 2:
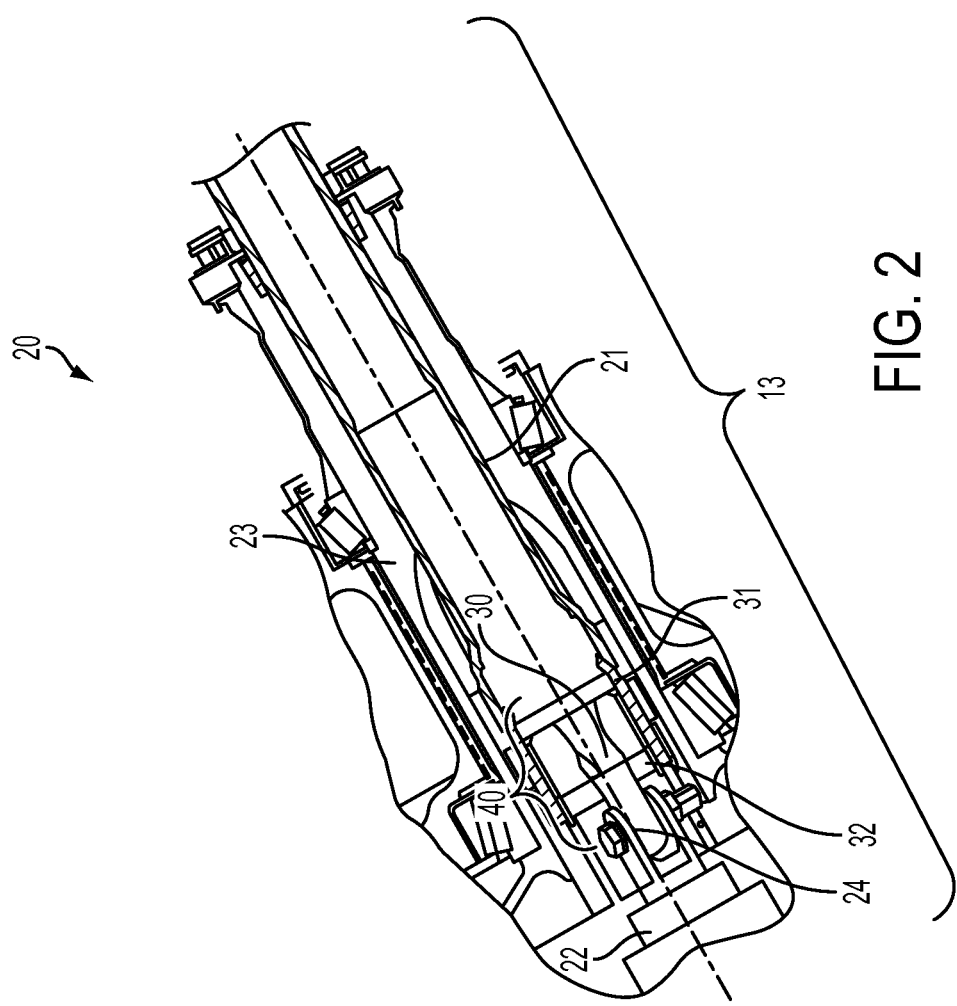
FIG. 2 is a schematic side view of an aircraft tail rotor system in accordance with embodiments.

With reference to FIG. 2, the tail section 13 includes an aircraft tail rotor (TR) system 20 that converts tail driveshaft rotary power into aerodynamic forces necessary to control the direction of flight of the aircraft 10 and to counteract the main rotor torque. The TR system 20 provides a mounting point for tail rotor blades (TRBs) and for a blade pitch change mechanism. The pitch of the TRBs is controlled by the position of the tail rotor pitch change shaft (PCS) 21. The positioning of the PCS 21 is controlled by a pitch change servo (hereinafter referred to as a "translating element 22"). When the translating element 22 pulls the PCS 21 inboard, a pitch walking beam and pitch change control links associated with each of the TRBs twist the TRBs about internal elastomeric bearings to increase blade pitch. Conversely, when the translating element 22 permits the PCS 21 to move outboard, the pitch walking beam and pitch change control links associated with each of the TRBs twist the TRBs about the internal elastomeric bearings to decrease blade pitch. An increase in blade pitch will turn the aircraft 10 to the left and a decrease in pitch will turn the aircraft 10 to the right.

The PCS 21 rotates with and moves linearly within a rotating tail rotor shaft (hereinafter referred to as a "rotating element 23"). A PCS bearing structure 30 supports the PCS 21 within the rotating element 23 and allows the PCS 21 and the rotating element 23 to rotate independently of the non-rotating translating element 22. As will be described below, an outer raceway of the PCS bearing structure 30 rotates with the PCS 21 and the rotating element 23, while an inner raceway is non-rotating and coupled to the translating element 22 by way of a clevis 24 and thereby moves linearly with the translating element 22.

In accordance with embodiments, the PCS bearing structure 30 includes two bearings in series (i.e., a primary PCS bearing 31 disposed in series with a secondary PCS bearing 32) with one of the two bearings (i.e., the primary PCS bearing 31) including a component that is rotatable with the PCS 21 and the rotating element 23 and which is movable within the rotating element 23 in accordance with movements of the translating element 22. The PCS bearing structure 30 is disposed in an operator accessible location so that it can be easily inspected by an operator and is configured to prevent transmission of rotational energy from the rotating element 23 to the translating element 22 in an event of a seizing of the one of the two bearings. The PCS bearing structure 30 may include a lock, such as a frangible element that is breakable in the event of the seizing and/or first and second elements that are capable of relative rotation in the event of the seizing.

Figure 3:
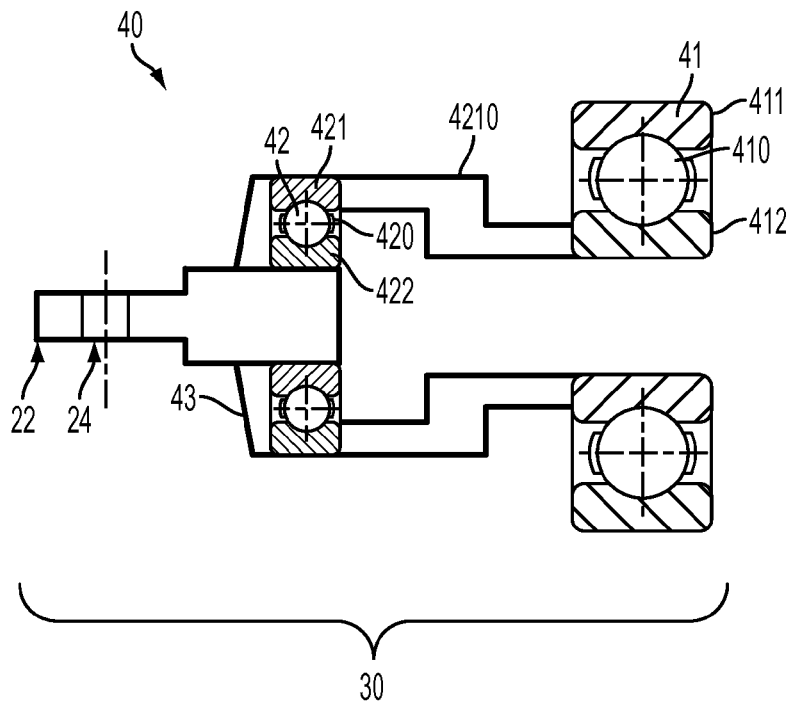
FIG. 3 is a schematic view of a PCS bearing assembly in accordance with embodiments.

With reference to FIG. 3, the PCS bearing structure 30 may include a PCS bearing assembly 40. As shown in FIG. 3, the PCS bearing assembly 40 includes a primary bearing 41, a secondary bearing 42 and a lock 43. The primary bearing 41 includes at least one or more ball or roller bearings 410 that securably lie between a first raceway 411, which may be but is not required to be an outer raceway, and a second raceway 412, which may be but is not required to be an inner raceway. In either case, the first raceway 411 is rotatable with and movable within the rotating element 23 in accordance with linear translational movements of the translating element 22. The secondary bearing 42 includes at least one or more ball or roller bearings 420 that securably lie between a third raceway 421, which may be but is not required to be an outer raceway, and a fourth raceway 422, which may be but is not required to be an inner raceway. The third raceway 421 is non-rotatably coupled to the second raceway 412 via connection 4210 and the fourth raceway 422 is non-rotatably coupled to the translating element 22 via the clevis 24 (see FIG. 2).

The lock 43 is disposed in an operator accessible location and is coupled to the secondary bearing 42 and is disposed to be locked to prevent relative rotation between the third raceway 421 and the fourth raceway 422 and to be unlocked in accordance with a condition of the primary bearing 41 to permit the relative rotation between the third raceway 421 and the fourth raceway 422. More particularly, the lock 43 is disposed to remain locked and thus prevent the relative rotation in accordance with the primary bearing 41 remaining in a normal, un-seized condition. By contrast, the lock 43 is disposed to become unlocked to thereby permit the relative rotation in accordance with the primary bearing 41 failing and becoming seized.

That is, in accordance with embodiments, when the primary bearing 41 remains in the normal, un-seized condition, the rotation of the rotating element 23 is not transferred from the first raceway 411 to the second raceway 412. However, when the primary bearing 41 fails and seizes, the rotation of the rotating element 23 is transferred to the second raceway 412. In this case, since the third raceway 421 is non-rotatably coupled to the second raceway 412, the transfer of rotation to the second raceway 412 would lead to a corresponding transfer of rotation to the third raceway 421. If not for the lock 43 becoming unlocked, the transfer of rotation to the third raceway 421 would in turn lead to a further corresponding transfer of rotation to the fourth raceway 422 and possible damage or breaking of the clevis 24 (see FIG. 2).

Figure 4A:
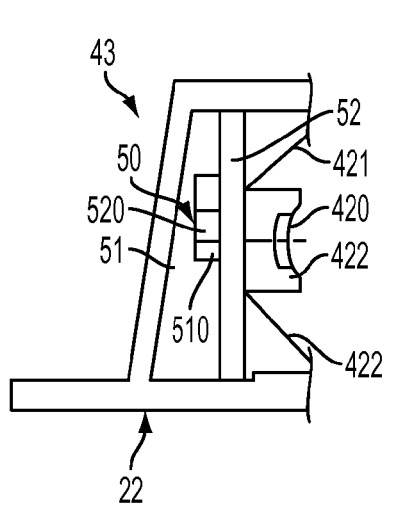
FIG. 4A is a plan view of a lock of the PCS bearing assembly in a locked state in accordance with embodiments.
Figure 4B:
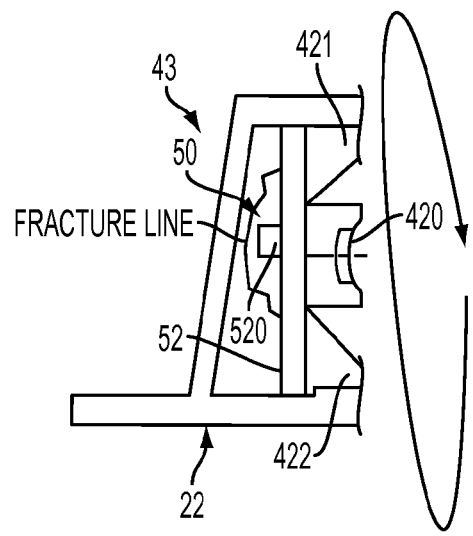
FIG. 4B is a plan view of the lock of FIG. 4A in an unlocked state.

With reference to FIGS. 4A and 4B, the lock 43 may include a frangible element 50, which is breakable in accordance with the primary bearing 41 (see FIG. 3) becoming seized. As shown in FIG. 4A, the frangible element 50 includes a first body 51, which is affixed to the translating element 22, and a second body 52, which is affixed to the third raceway 421. Either or both of the first body 51 and the second body 52 may be frangible. However, for purposes of clarity and brevity, it will be assumed that the first body 51 is frangible. In this case, the second body 52 includes bosses 520 that are disposed to mechanically interfere with breakable members 510 of the first body 51. Due to the mechanical interference, the rotation of the third raceway 421 relative to the fourth raceway 422 and the translating element 22 is prevented as long as the first body 51 remains unbroken (see FIG. 4A). However, as soon as the first body 51 breaks, rotation of the third raceway 421 relative to the fourth raceway 422 and the translating element 22 is permitted as the bosses 520 of the second body 52 no longer mechanically interfere with the breakable members 510 of the first body 51 (see the fracture line of FIG. 4B).

In accordance with embodiments, the breakable members 510 of the first body 51 may be configured to break upon a seizing of the primary bearing 41 whereupon the rotation of the rotating element 23 is transmitted to the third raceway 421. The transmission of the rotation causes the bosses 520 of the second body 52 to impinge upon the breakable members 510 with greater force that the breakable members 510 are designed to withstand. The breakable members 510 break as a result and the rotation of the third raceway 421 is prevented from being transferred to the fourth raceway 422 by the ball or roller bearings 420. Thus, possible damage or breaking of the clevis 24 (see FIG. 2) may be avoided. Moreover, since the lock 43/frangible element 50 is disposed in the operator accessible location, an operator will be able to relatively easily examine the breakable members 510 of the first body 51 and ascertain that breakage has occurred and that replacement of at least the primary bearing 41 is necessary.

Figure 5A:
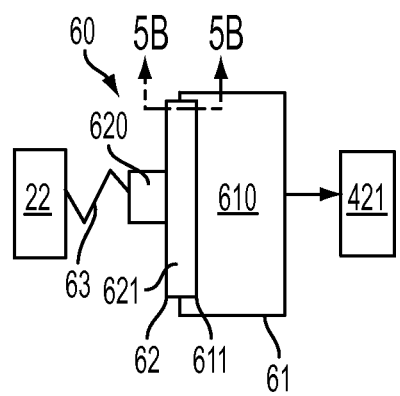
FIG. 5A is a plan view of a lock of the PCS bearing assembly in a locked state in accordance with alternative embodiments.
Figure 5B:
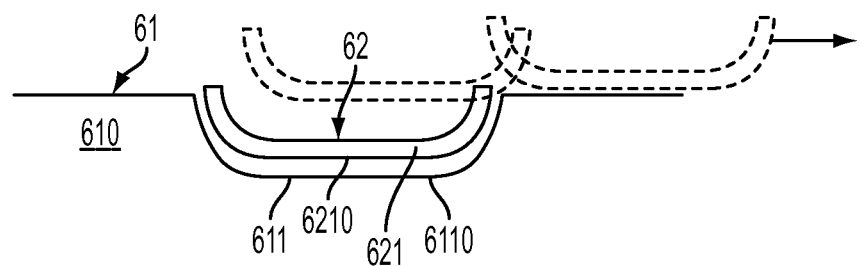
FIG. 5B is an enlarged view of the lock of FIG. 5A seen along line B-B of FIG. 5B as the lock enters and assumes an unlocked state.

With reference to another embodiment shown in FIGS. 5A and 5B, the lock 43 may include a star washer assembly 60 including a star washer receiver body 61, which may be affixed to either the translating element 22 or the third raceway 421, a star washer 62, which may be affixed to the other of the translating element 22 or the third raceway 421, and an elastic element 63. For purposes of clarity and brevity, it will be assumed that the star washer receiver body 61 is affixed to the third raceway 421, that the star washer 62 is affixed to the translating element 22 and that the elastic element 63 acts on the star washer 62 directly. As shown in FIG. 5A, the star washer 62 includes a hub 620 affixed to the translating element 22 and radial vanes 621 that emanate from the hub 620 along a radial dimension. The star washer receiver body 61 includes a volumetric body 610 having radial vane depressions 611 defined therein. The radial vane depressions 611 are formed to be receptive of the radial vanes 621 and the elastic element 63 is disposed to urge the star washer 62 towards the star washer receiver body 61 such that the radial vanes 621 are correspondingly urged in the radial vane depressions 611.

As shown in FIG. 5B, the radial vanes 621 may each have a partially convex (or slightly rounded) surface 6210 and the radial vane depressions 611 of the star washer receiver body 61 may each have a partially concave (or slightly rounded) surface 6110. As such, the radial vanes 621 can slip into and out of the radial vanes depressions 611 in accordance with the primary bearing 41 being un-seized or seized, as will be described below.

With the star washer 62 urged toward the star washer receiver body 61 such that the radial vanes 621 are correspondingly received in the radial vane depressions 611, rotation of the third raceway 421 relative to the fourth raceway 422 and the translating element 22 is prevented as long as the radial vanes 621 remain in the radial vane depressions 611 (see FIG. 5A). However, as soon as the radial vanes 621 retreat from the radial vane depressions 611, rotation of the third raceway 421 relative to the fourth raceway 422 and the translating element 22 is permitted (see FIG. 5B).

In accordance with embodiments, the radial vanes 621 may be configured to be securably received in the radial vane depressions 611 by frictional contact or mechanical interference in accordance with the bias applied by the elastic element 63. However, the radial vanes 621 may retreat from the radial vane depressions 611 upon a seizing of the primary bearing 41 whereupon the rotation of the rotating element 23 is transmitted to the third raceway 421 and overpowers the frictional contact or mechanical interference. Subsequently, with the radial vanes 621 retreated from the radial vane depressions 611, the rotation of the third raceway 421 is prevented from being transferred to the fourth raceway 422 by the ball or roller bearings 420 and possible damage or breaking of the clevis 24 (see FIG. 2) may be avoided. Thus, the star washer assembly 60 may be configured to perform a slip-clutch function.

Moreover, since the lock 43/star washer assembly 60 is disposed in the operator accessible location, an operator will be able to relatively easily examine the star washer 62 and ascertain that the radial vanes 621 have retreated from the radial vane depressions 620 and that replacement of at least the primary bearing 41 is necessary. To the extent that the retreating of the radial vanes 621 may not be obvious due to rotational positioning at the time of the inspection, it is further noted that the relative rotation between the star washer receiving body 61 and the star washer 62 will be audible to an operator or pilot of the aircraft 10 or detectable by vibration or by noise or vibration sensing equipment since the radial vanes 621 will impact the edges of the radial vane depressions 611 and create substantial noise. This noise will alert the operator or pilot that the replacement of at least the primary bearing 41 is necessary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft tail rotor system, comprising:
   a tail rotor shaft;
   a pitch change servo rod;
   a bearing assembly including a first bearing arranged in series relative to and spaced from a second bearing, the first bearing including a first raceway, a second raceway, and a plurality of bearing arranged therebetween, the first raceway being rotatable with and movable within the tail rotor shaft in accordance with translational movement of the pitch change servo rod, the second bearing including an third raceway, a fourth raceway and a plurality of bearings arranged therebetween;
   a connection non-rotatably coupling the third raceway of the second bearing and the first raceway of the first bearing; and
   a lock coupled to the second bearing, the lock selectively preventing rotation of the third raceway relative to the fourth raceway, the lock being configured to directly and independently respond to a seizing of the first bearing at the second bearing from a transmission of rotation of the first bearing to the second bearing and to selectively use the second bearing to prevent transmission of rotational energy from the tail rotor shaft to the pitch change servo rod in an event of the seizing of the first bearing.

2. The aircraft tail rotor system according to claim 1, wherein the lock is disposed in an operator accessible location.

3. The aircraft tail rotor system according to claim 1, wherein the lock comprises a frangible element that is breakable in the event of the seizing to selectively use the second bearing and which is not breakable when the first bearing is not seized, the frangible element comprising:
   a first frangible body, which includes a breakable member and which is affixed to the pitch change servo rod; and
   a second body, which includes a boss disposed to mechanically interfere with the breakable member and which is affixed to a component of the second bearing.

4. The aircraft tail rotor system according to claim 1, wherein the lock comprises:
   a star washer including a hub affixed to the pitch change servo rod and radial vanes emanating radially from the hub;
   a star washer receiver body affixed to a component of the second bearing and including a body having radial vane depressions; and
   an elastic element disposed to urge the radial vanes into the radial vane depressions.

5. A bearing assembly, comprising:
   a primary bearing including first and second raceways, the first raceway being rotatable with and movable within a tail rotor shaft in accordance with movements of a pitch change servo rod;
   a secondary bearing including a third raceway non-rotatably coupled to the second raceway and a fourth raceway non-rotatably coupled to the pitch change servo rod, the secondary bearing being arranged in series relative to and spaced from the primary bearing; and
   a lock coupled to the secondary bearing and disposed to prevent relative rotation between the third and fourth raceways and to selectively permit the relative rotation in accordance with a condition of the primary bearing being rotationally transmitted to the secondary bearing and directly independently responded to by the lock at the secondary bearing.

6. The bearing assembly according to claim 5, wherein the first and third raceways are outer raceways of the primary and secondary bearings, respectively, and the second and fourth raceways are inner raceways of the primary and secondary bearings, respectively.

7. The bearing assembly according to claim 5, wherein the lock is disposed in an operator accessible location.

8. The bearing assembly according to claim 5, wherein the lock is disposed to prevent the relative rotation in accordance with the primary bearing being un-seized and permits the relative rotation in accordance with the primary bearing being seized.

9. The bearing assembly according to claim 8, wherein the lock comprises a frangible element, which is breakable in accordance with the primary bearing being seized, and which is not breakable when the primary bearing is not seized, the frangible element comprising:
   a first frangible body, which includes a breakable member and which is affixed to the pitch change servo rod; and
   a second body, which includes a boss disposed to mechanically interfere with the breakable member and which is affixed to the third raceway of the second bearing.

10. The bearing assembly according to claim 8, wherein the lock comprises:
    a star washer receiver; and
    a star washer, which is rotatable relative to the star washer receiver in accordance with the primary bearing being seized, and which is not rotatable when the primary bearing is not seized, wherein:
       the star washer includes a hub affixed to the pitch change servo rod and radial vanes emanating radially from the hub,
       the star washer receiver is affixed to the third raceway of the second bearing and includes a body having radial vane depressions, and
       the lock further comprises an elastic element disposed to urge the radial vanes into the radial vane depressions.

11. An aircraft tail rotor system, comprising:
    a tail rotor shaft;
    a pitch change servo rod; and
    a bearing assembly, comprising:
       a primary bearing including first and second raceways, the first raceway being rotatable with and movable within the tail rotor shaft in accordance with movements of the pitch change servo rod;
       a secondary bearing including a third raceway non-rotatably coupled to the second raceway and a fourth raceway non-rotatably coupled to the pitch change servo rod; and
       a lock coupled to the secondary bearing and disposed to be locked to prevent relative rotation between the third and fourth raceways and to be selectively unlocked to permit the relative rotation in accordance with a condition of the primary bearing being rotationally transmitted from the second raceway of the primary bearing to the third raceway of the secondary bearing and directly, independently, responded to by the lock at the secondary bearing.

12. The aircraft tail rotor system according to claim 11, further comprising a clevis to couple the fourth raceway and the pitch change servo rod.

13. The aircraft tail rotor system according to claim 11, wherein the first and third raceways are outer raceways of the primary and secondary bearings, respectively, and the second and fourth raceways are inner raceways of the primary and secondary bearings, respectively.

14. The aircraft tail rotor system according to claim 11, wherein the lock is disposed in an operator accessible location.

15. The aircraft tail rotor system according to claim 11, wherein the lock is disposed to prevent the relative rotation in accordance with the primary bearing being un-seized and permits the relative rotation in accordance with the primary bearing being seized.

16. The aircraft tail rotor system according to claim 15, wherein the lock comprises a frangible element, which is breakable in accordance with the primary bearing being seized, and which is not breakable with the primary bearing not seized, the frangible element comprising:
    a first frangible body, which includes a breakable member and which is affixed to the pitch change servo rod; and
    a second body, which includes a boss disposed to mechanically interfere with the breakable member and which is affixed to the third raceway of the second bearing.

17. The aircraft tail rotor system according to claim 15, wherein the lock comprises:

a star washer receiver; and a star washer, which is rotatable relative to the star washer receiver in accordance with the primary bearing being seized, and which is not rotatable when the primary bearing is not seized, wherein:

the star washer includes a hub affixed to the pitch change servo rod and radial vanes emanating radially from the hub, the star washer receiver is affixed to the third raceway of the second bearing and includes a body having radial vane depressions, and the lock further comprises an elastic element disposed to urge the radial vanes into the radial vane depressions.

\* \* \* \* \*